US009512255B2

(12) United States Patent
Watanabe et al.

(10) Patent No.: US 9,512,255 B2
(45) Date of Patent: Dec. 6, 2016

(54) VINYLIDENE FLUORIDE COPOLYMERS AND USES OF THE COPOLYMERS (75) Inventors: Keisuke Watanabe, Tokyo (JP); Yuuki Sakai, Tokyo (JP); Emi Sugawara, Tokyo (JP); Shintarou Mutou, Tokyo (JP); Tamito Igarashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 406 days.

(21) Appl. No.: 13/994,982

(22) PCT Filed: Dec. 22, 2011

(86) PCT No.: PCT/JP2011/079879
§ 371 (c)(1),
(2), (4) Date: Jun. 17, 2013

(87) PCT Pub. No.: WO2012/090876
PCT Pub. Date: Jul. 5, 2012

(65) Prior Publication Data
US 2013/0273424 A1    Oct. 17, 2013

(30) Foreign Application Priority Data
Dec. 28, 2010   (JP) ................ 2010-292594

(51) Int. Cl.
  *C08F 214/22*   (2006.01)
  *H01M 10/052*   (2010.01)
  *C09D 127/16*   (2006.01)
  *H01M 4/62*     (2006.01)

(52) U.S. Cl.
  CPC ......... *C08F 214/225* (2013.01); *C09D 127/16* (2013.01); *H01M 4/623* (2013.01);
  (Continued)

(58) Field of Classification Search
  USPC ........................................ 526/255; 429/217
  See application file for complete search history.

(56) References Cited

U.S. PATENT DOCUMENTS 3,261,817 A    7/1966 Angelo
4,680,149 A    7/1987 Rawlings et al.
(Continued)

FOREIGN PATENT DOCUMENTS

CN    101821298 A    9/2010
EP    1 586 592 A1    10/2005
(Continued)

OTHER PUBLICATIONS

Li et al., "Preparation and characterization of a novel bipolar membrane by plasma-induced polymerization," Journal of Membrane Science (2008), vol. 318, pp. 429-434.
(Continued)

*Primary Examiner* — Peter D Mulcahy
*Assistant Examiner* — Henry Hu
(74) *Attorney, Agent, or Firm* — Birch, Stewart, Kolasch & Birch, LLP (57) ABSTRACT

Provided are vinylidene fluoride copolymers exhibiting higher adhesion with respect to metal foils than do conventional vinylidene fluoride copolymers, and to provide uses of the vinylidene fluoride copolymers. The vinylidene fluoride copolymers are obtained by copolymerizing vinylidene fluoride with a compound represented by Formula (A). In Formula (A), $R^1$, $R^2$ and $R^3$ are each independently a hydrogen atom, a chlorine atom or an alkyl group; and X is an atomic group with a molecular weight of not more than 500 containing a heteroatom and having a main chain composed of 1 to 20 atoms, or is a heteroatom.

10 Claims, 1 Drawing Sheet

(52) U.S. Cl.
CPC ...... *H01M 10/052* (2013.01); *H01M 2220/20* (2013.01); *Y02T 10/7011* (2013.01)

(56) References Cited

U.S. PATENT DOCUMENTS

| | | | |
|---|---|---|---|
| 5,037,922 A | | 8/1991 | Kappler et al. |
| 5,415,958 A | * | 5/1995 | Takahashi ............ C08F 214/225 |
| | | | 429/217 |
| 6,265,107 B1 | | 7/2001 | Shimizu et al. |
| 7,947,790 B2 | * | 5/2011 | Katsurao .............. B01D 67/002 |
| | | | 526/242 |
| 8,298,446 B2 | | 10/2012 | Sakuma et al. |
| 8,337,725 B2 | * | 12/2012 | Abusleme .............. B01D 69/02 |
| | | | 252/511 |
| 2006/0088680 A1 | | 4/2006 | Kitahara et al. |
| 2009/0203853 A1 | | 8/2009 | Fujita et al. |

FOREIGN PATENT DOCUMENTS

| | | | |
|---|---|---|---|
| EP | 1 992 646 A1 | | 11/2008 |
| GB | 2072203 A | | 9/1981 |
| JP | 56133309 A | | 10/1981 |
| JP | 2000604 A | | 1/1990 |
| JP | 3-20311 A | | 1/1991 |
| JP | 6172452 A | | 6/1994 |
| JP | 07201316 A | | 8/1995 |
| JP | 11-329446 A | * | 11/1999 |
| JP | 11-329446 A | | 11/1999 |
| JP | 2001-23643 A | | 1/2001 |
| JP | 2010525124 A | | 7/2010 |
| WO | WO 87/07208 A1 | | 12/1987 |
| WO | 2004092257 A1 | | 10/2004 |
| WO | WO 2008129041 A1 | * | 10/2008 |

OTHER PUBLICATIONS

Notification of Reasons for Rejection issued May 12, 2015, in Japanese Patent Application No. 2012-550907, with English translation.

Extended European Search Report issued Jan. 22, 2016, in European Patent Application No. 11852933.8.

* cited by examiner

VINYLIDENE FLUORIDE COPOLYMERS AND USES OF THE COPOLYMERS

TECHNICAL FIELD

The present invention relates to vinylidene fluoride copolymers and uses of the copolymers. More particularly, the invention relates to vinylidene fluoride copolymers, battery electrode binders, electrode mixtures for nonaqueous electrolyte secondary batteries, electrodes for nonaqueous electrolyte secondary batteries, and nonaqueous electrolyte secondary batteries.

BACKGROUND ART

The electronic technology has recently made remarkable progress and has been successful in the reduction in size and weight of various devices. Along with the miniaturization and weight reduction of electronic devices, batteries that supply power to such devices are also required to be smaller and lighter. Nonaqueous electrolyte lithium secondary batteries are a type of batteries which can supply large amounts of energy with small volume and mass of the batteries. Further, nonaqueous electrolyte secondary batteries are proposed to be used as power sources for hybrid vehicles, electrical vehicles and the like, and some have come into actual use.

In electrodes of nonaqueous electrolyte secondary batteries, polyvinylidene fluoride (PVDF) is used as a binder (a binder resin).

PVDF is excellent in such properties as chemical resistance, weather resistance and contamination resistance, and exhibits excellent properties such as electrochemical stability, mechanical properties and slurry characteristics. However, PVDF shows weak adhesion with respect to metal foils used as collectors in nonaqueous electrolyte secondary batteries. To remedy this, various methods have been proposed in order to improve the adhesion of PVDF.

For example, vinylidene fluoride copolymers have been proposed which are obtained by graft polymerization of an acrylic monomer to a PVDF backbone by the application of radiation (see, for example, Patent Literature 1). Such vinylidene fluoride copolymers exhibit higher adhesion to metal foils than does PVDF. However, the fact that radiations are utilized in the production of such copolymers requires a special facility as well as a difficult control.

Other copolymers are also known, including fluorine-containing copolymers obtained by copolymerizing vinylidene fluoride with maleic acid anhydride and hydrolyzing the acid anhydride (see, for example, Patent Literature 2); vinylidene fluoride copolymers obtained by copolymerizing vinylidene fluoride with an unsaturated dibasic acid monoester such as monomethyl maleate (see, for example, Patent Literature 3); and vinylidene fluoride copolymers obtained by copolymerizing vinylidene fluoride with an acrylic acid compound (see, for example, Patent Literature 4).

However, these polymers are still unsatisfactory in terms of adhesion to metal foils.

CITATION LIST

Patent Literature

Patent Literature 1: JP-A-S56-133309
Patent Literature 2: JP-A-H02-604
Patent Literature 3: JP-A-H06-172452
Patent Literature 4: JP-A-2010-525124

The present invention has been made in view of the problems in the art described above. It is therefore an object of the invention to provide novel vinylidene fluoride copolymers exhibiting higher adhesion with respect to metal foils than do conventional vinylidene fluoride copolymers.

It is another object of the invention to provide battery electrode binders containing the vinylidene fluoride copolymer and a nonaqueous solvent, and electrode mixtures for nonaqueous electrolyte secondary batteries that allow for efficient production of electrodes for nonaqueous electrolyte secondary batteries and of nonaqueous electrolyte secondary batteries as well as allow for the production of electrodes for nonaqueous electrolyte secondary batteries exhibiting excellent peel strength between the mixture layer and a collector.

It is a further object of the invention to provide electrodes for nonaqueous electrolyte secondary batteries obtained by applying the mixture to a collector and drying the coating, as well as to provide nonaqueous electrolyte secondary batteries having the electrode.

The present inventors have carried out studies in order to achieve the above objects. As a result, the present inventors have found that vinylidene fluoride copolymers obtained by copolymerizing vinylidene fluoride with a specific compound exhibit excellent adhesion with respect to metal foils, and that electrode mixtures for nonaqueous electrolyte secondary batteries containing the copolymers can achieve the aforementioned objects, thus completing the present invention.

A vinylidene fluoride copolymer according to the present invention is obtained by copolymerizing vinylidene fluoride with a compound represented by Formula (A) below:

[Chem. 1]

(A)

(In Formula (A), $R^1$, $R^2$ and $R^3$ are each independently a hydrogen atom, a chlorine atom or an alkyl group having 1 to 5 carbon atoms; and X is an atomic group with a molecular weight of not more than 500 containing at least one heteroatom selected from oxygen atom, sulfur atom, nitrogen atom and phosphorus atom and having a main chain composed of 1 to 20 atoms, or is a heteroatom.)

It is preferable that X be the atomic group and the heteroatom in the atomic group be oxygen atom.

The compound represented by Formula (A) is preferably at least one compound selected from compounds represented by Formula (1) below and compounds represented by Formula (2) below. More preferably, the compound represented by Formula (A) is a compound represented by Formula (3) below.

[Chem. 2]

(1)

(In Formula (1), $R^1$, $R^2$ and $R^3$ are each independently a hydrogen atom, a chlorine atom or an alkyl group having 1 to 5 carbon atoms; and X' is an atomic group with a molecular weight of not more than 472 having a main chain composed of 1 to 19 atoms.)

[Chem. 3]

(2)

(In Formula (2), $R^1$, $R^2$ and $R^3$ are each independently a hydrogen atom, a chlorine atom or an alkyl group having 1 to 5 carbon atoms; and X" is an atomic group with a molecular weight of not more than 484 having a main chain composed of 1 to 19 atoms.)

[Chem. 4]

(3)

(In Formula (3), $R^1$, $R^2$ and $R^3$ are each independently a hydrogen atom, a chlorine atom or an alkyl group having 1 to 5 carbon atoms; and X''' is an atomic group with a molecular weight of not more than 456 having a main chain composed of 1 to 18 atoms.)

The copolymer preferably contains 0.01 to 10 mol % of structural units derived from the compound represented by Formula (A) (relative to the total of structural units derived from vinylidene fluoride and structural units derived from the compound represented by Formula (A) taken as 100 mol %).

The inventive vinylidene fluoride copolymer preferably has an inherent viscosity of 0.5 to 5.0 dl/g.

In the inventive vinylidene fluoride copolymer, the randomness of the structural units derived from the compound represented by Formula (A) is preferably not less than 40%.

A battery electrode binder according to the invention includes the vinylidene fluoride copolymer and a nonaqueous solvent.

An electrode mixture for nonaqueous electrolyte secondary batteries according to the invention includes the vinylidene fluoride copolymer, an electrode active material and a nonaqueous solvent. A positive electrode mixture for nonaqueous electrolyte secondary batteries according to the invention includes the vinylidene fluoride copolymer, a lithium-based positive electrode active material and a nonaqueous solvent.

An electrode for nonaqueous electrolyte secondary batteries according to the invention is obtained by applying the electrode mixture for nonaqueous electrolyte secondary batteries to a collector, and drying the coating. A positive electrode for nonaqueous electrolyte secondary batteries according to the invention is obtained by applying the positive electrode mixture for nonaqueous electrolyte secondary batteries to a collector, and drying the coating.

A nonaqueous electrolyte secondary battery according to the invention has the electrode for nonaqueous electrolyte secondary batteries, and preferably has the positive electrode for nonaqueous electrolyte secondary batteries.

The vinylidene fluoride copolymers of the invention exhibit higher adhesion with respect to metal foils than do conventional vinylidene fluoride copolymers. Thus, the battery electrode binders and the electrode mixtures for nonaqueous electrolyte secondary batteries of the invention allow for efficient production of electrodes for nonaqueous electrolyte secondary batteries and of nonaqueous electrolyte secondary batteries as well as allow for the production of electrodes for nonaqueous electrolyte secondary batteries exhibiting excellent peel strength between the mixture layer and a collector. Because of the use of the electrode mixtures for nonaqueous electrolyte secondary batteries, the electrodes for nonaqueous electrolyte secondary batteries and the nonaqueous electrolyte secondary batteries of the invention can be produced with good productivity.

DETAILED DESCRIPTION OF THE INVENTION

The present invention will be described in detail hereinbelow.

[Vinylidene Fluoride Copolymers]

A vinylidene fluoride copolymer according to the present invention is obtained by copolymerizing vinylidene fluoride with a compound represented by Formula (A) below:

[Chem. 5]

(A)

(In Formula (A), $R^1$, $R^2$ and $R^3$ are each independently a hydrogen atom, a chlorine atom or an alkyl group having 1 to 5 carbon atoms; and X is an atomic group with a molecular weight of not more than 500 containing at least one heteroatom selected from oxygen atom, sulfur atom, nitrogen atom and phosphorus atom and having a main chain composed of 1 to 20 atoms, or is a heteroatom.)

The inventive vinylidene fluoride copolymer has structural units derived from vinylidene fluoride and structural units derived from the compound represented by Formula (A). The copolymer may further have structural units derived from additional monomers.

When X in the compound represented by Formula (A) is an atomic group with a molecular weight of not more than 500 which contains at least one heteroatom selected from oxygen atom, sulfur atom, nitrogen atom and phosphorus atom and has a main chain composed of 1 to 20 atoms, the atomic group should contain at least one heteroatom and may contain a plurality of heteroatoms. In the case where X is such an atomic group, the heteroatom is preferably oxygen atom from the viewpoint of the copolymerizability with vinylidene fluoride.

When X represents the atomic group, the molecular weight of the atomic group is not more than 500, and preferably not more than 200. The lower limit of the molecular weight of the atomic group is not particularly limited, but is usually 15.

From the viewpoint of the adhesion with respect to metal foils, the compound represented by Formula (A) is preferably at least one compound selected from compounds represented by Formula (1) below and compounds represented by Formula (2) below.

From the viewpoint of the adhesion with respect to metal foils, the compound represented by Formula (A) is more preferably a compound represented by Formula (1), and the compound represented by Formula (1) is preferably a compound represented by Formula (3). A copolymer of vinylidene fluoride with a compound represented by Formula (A) exhibits a high degree of freedom in the configuration of carboxyl groups because the carboxyl groups functioning as adhesive functional groups are remote from the main chain of the vinylidene fluoride polymer via the spacers. The present inventors assume that this high degree of freedom allows the copolymer to easily take a configuration best suited for the functional groups to interact with adherent, thus achieving excellent adhesion to collectors. A compound represented by Formula (1) has a carbonyl group in addition to the carboxyl group. The carbonyl groups can be coordinated to metal atoms constituting a collector. The present inventors assume that this is the reason why a vinylidene fluoride copolymer utilizing this compound exhibits particularly excellent adhesion to collectors.

[Chem. 6]

(1)

(In Formula (1), $R^1$, $R^2$ and $R^3$ are each independently a hydrogen atom, a chlorine atom or an alkyl group having 1 to 5 carbon atoms; and X' is an atomic group with a molecular weight of not more than 472 having a main chain composed of 1 to 19 atoms.)

[Chem. 7]

(2)

(In Formula (2), $R^1$, $R^2$ and $R^3$ are each independently a hydrogen atom, a chlorine atom or an alkyl group having 1 to 5 carbon atoms; and X" is an atomic group with a molecular weight of not more than 484 having a main chain composed of 1 to 19 atoms.)

[Chem. 8]

(3)

(In Formula (3), $R^1$, $R^2$ and $R^3$ are each independently a hydrogen atom, a chlorine atom or an alkyl group having 1 to 5 carbon atoms; and X''' is an atomic group with a molecular weight of not more than 456 having a main chain composed of 1 to 18 atoms.)

In Formulae (A) and (1) to (3), $R^1$, $R^2$ and $R^3$ are each independently a hydrogen atom, a chlorine atom or an alkyl group having 1 to 5 carbon atoms. From the viewpoint of polymerization reactivity, these substituents, in particular $R^1$ and $R^2$, desirably have small steric hindrance and are preferably hydrogen atoms or alkyl groups having 1 to 3 carbon atoms, and more preferably hydrogen atoms or methyl groups.

In Formula (1), the molecular weight of the atomic group represented by X' is not more than 472, and preferably not more than 172. The lower limit of the molecular weight of the atomic group represented by X' is not particularly limited. In a usual embodiment, however, the lower limit is given by X' being —$CH_2$—, namely, the lower limit of the molecular weight is 14. In Formula (2), the molecular weight of the atomic group represented by X" is not more than 484, and preferably not more than 184. The lower limit of the molecular weight of the atomic group represented by X" is not particularly limited. In a usual embodiment, however, the lower limit is given by X" being —$CH_2$—, namely, the lower limit of the molecular weight is 14. In Formula (3), the molecular weight of the atomic group represented by X''' is not more than 456, and preferably not more than 156. The lower limit of the molecular weight of the atomic group represented by X''' is not particularly limited. In a usual embodiment, however, the lower limit is given by X''' being —$CH_2$—, namely, the lower limit of the molecular weight is 14.

The above molecular weights of the atomic group represented by X, X', X" or X''' are preferable from the viewpoint of polymerizability.

Referring to the atomic group represented by X in Formula (A), the main chain of the atomic group is composed of 1 to 20 atoms, preferably 2 to 15 atoms, and more preferably 2 to 10 atoms.

Referring to the atomic group represented by X' in Formula (1), the main chain is composed of 1 to 19 atoms, preferably 1 to 14 atoms, and more preferably 1 to 9 atoms.

Referring to the atomic group represented by X" in Formula (2), the main chain is composed of 1 to 19 atoms, preferably 1 to 14 atoms, and more preferably 1 to 9 atoms.

Referring to the atomic group represented by X''' in Formula (3), the main chain is composed of 1 to 18 atoms, preferably 1 to 13 atoms, and more preferably 1 to 8 atoms.

The above numbers of atoms constituting the main chain are preferable from the viewpoint of polymerizability.

In the Formulae (A) and (1) to (3), the number of atoms constituting the main chain indicates the number of atoms forming the backbone of the shortest chain linking the carboxyl group to the right of X, X', X" or X''' and the group to the left thereof ($R^1R^2C=CR^3$— in Formula (A)), ($R^1R^2C$=$CR^3$—CO— in Formula (1)), ($R^1R^2C$=$CR^3$—O— in Formula (2)) or ($R^1R^2C$=$CR^3$—COO— in Formula (3)).

The numbers of atoms of the main chains of acryloyloxyethyl succinate (2-acryloxy ethyl succinate) (AES) and carboxyethyl acrylate (2-carboxyethyl acrylate) (CEA) used in examples are as follows.

AES corresponds to a compound represented by Formula (A), a compound represented by Formula (1) and a compound represented by Formula (3). In the case where a compound represented by Formula (A) is AES, the atomic group represented by X is —(CO)—$OCH_2CH_2O$—(CO)—$CH_2CH_2$—. The number of atoms of the main chain of this atomic group is the number of atoms constituting the linear backbone. That is, the carbonyl oxygen atoms and the methylene hydrogen atoms are not included in counting the number of atoms of the main chain. In detail, the linear backbone is —C—OCCO—C—CC— constituted by 8 atoms. When a compound represented by Formula (1) is AES, the main chain of the atomic group represented by X' is composed of 7 atoms. When a compound represented by Formula (3) is AES, the main chain of the atomic group represented by X''' is composed of 6 atoms.

CEA corresponds to a compound represented by Formula (A), a compound represented by Formula (1) and a compound represented by Formula (3). When a compound represented by Formula (A) is CEA, the main chain of the atomic group represented by X is composed of 4 atoms. When a compound represented by Formula (1) is CEA, the main chain of the atomic group represented by X' is composed of 3 atoms. When a compound represented by Formula (3) is CEA, the main chain of the atomic group represented by X''' is composed of 2 atoms.

The number of atoms of the main chain of acryloyloxyethyl phthalate is as follows. Acryloyloxyethyl phthalate is represented by Formula (B) below, and corresponds to a compound represented by Formula (A), a compound represented by Formula (1) and a compound represented by Formula (3). In the case where a compound represented by Formula (A) is acryloyloxyethyl phthalate, the atomic group represented by X is represented by Formula (B') below. The number of atoms of the main chain of this atomic group is the number of atoms forming the backbone of the shortest chain linking the carboxyl group and the vinyl group bonded to the atomic group. That is, referring to Formula (B'), the backbone of the chain linking the carboxyl group and the vinyl group may be regarded as being composed of 8 atoms as illustrated in Formula (B'-1) or 12 atoms as illustrated in Formula (B'-2). In this case, the smaller number of carbon atoms, namely 8, is taken as the number of atoms of the main chain. When a compound represented by Formula (1) is acryloyloxyethyl phthalate, the main chain of the atomic group represented by X' is composed of 7 atoms. When a compound represented by Formula (3) is acryloyloxyethyl phthalate, the main chain of the atomic group represented by X''' is composed of 6 atoms.

In the case where a compound has a plurality of carboxyl groups, the number of atoms of the main chain is determined in the following manner. In a compound having a plurality of carboxyl groups, the respective carboxyl groups are linked to the group on the left side through the respective shortest chains. Of such chains, the number of atoms constituting the shortest backbone is taken as the number of atoms of the main chain. In the case of a compound having two carboxyl groups as an example, the respective carboxyl groups (hereinafter, referred to as carboxyl group A and carboxyl group B for convenience sake) are linked to the group on the left side through the respective shortest chains. Provided that, for example, the backbone of the shortest chain linking the left group and the carboxyl group A is composed of 3 atoms, and the backbone of the shortest chain linking the left group and the carboxyl group B is composed of 6 atoms, the number of atoms of the main chain in such a compound is 3. As a specific example, a compound represented by Formula (C) below will be discussed. A compound represented by Formula (C) corresponds to a compound represented by Formula (A), a compound represented by Formula (1) and a compound represented by Formula (3). Such a compound represented by Formula (C) has two carboxyl groups. When a compound represented by Formula (A) is a compound represented by Formula (C), the backbone of the shortest chain linking the vinyl group and the carboxyl group may be regarded as being composed of 6 atoms as illustrated in Formula (C-1) or 8 atoms as illustrated in Formula (C-2). In this case, the smaller number of atoms forming the backbone, namely 6, is taken as the number of atoms of the main chain. When a compound represented by Formula (1) is a compound represented by Formula (C), the main chain of the atomic group represented by X' is composed of 5 atoms. When a compound represented by Formula (3) is a compound represented by Formula (C), the main chain of the atomic group represented by X''' is composed of 4 atoms.

[Chem. 9]

CEA

AES

(B)

(B')

(B'-1)

-continued (B'-2)

(C)

(C-1)

(C-2)

As already mentioned, the compound represented by Formula (A) is preferably at least one compound selected from compounds represented by Formula (1) and compounds represented by Formula (2). Other compounds may be used. Examples of such other compounds include vinylamine compounds such as vinyl(carboxyethyl)amine and vinyl(carboxymethyl)amine, vinylthioether compounds such as vinyl(carboxyethyl)thioether and vinyl(carboxymethyl)thioether, and vinyl phoshonate compounds such as (carboxyethyl) vinylphosphonate.

The letter X in Formula (A) may be a heteroatom. Examples of the heteroatoms include oxygen atom and sulfur atom.

Preferred compounds represented by Formula (1) are compounds represented by Formula (3). Exemplary other compounds include (meth)acrylamide compounds and thio (meth)acrylate compounds, with specific examples including N-carboxyethyl(meth)acrylamide and carboxyethyl thio (meth)acrylate.

In the present invention, the terms "(meth)acrylic" and "(meth)acrylate" mean acrylic and/or methacrylic, and acrylate and/or methacrylate, respectively.

Examples of the compounds represented by Formula (2) include vinylcarboxyalkyl ethers such as vinylcarboxymethyl ether and vinylcarboxyethyl ether.

Examples of the compounds represented by Formula (3) include 2-carboxyethyl acrylate, 2-carboxyethyl methacrylate, acryloyloxyethyl succinate, methacryloyloxyethyl succinate, acryloyloxyethyl phthalate and methacryloyloxyethyl phthalate. 2-Carboxyethyl acrylate, 2-carboxyethyl methacrylate, acryloyloxyethyl succinate and methacryloyloxyethyl succinate are preferable because of excellent copolymerizability with vinylidene fluoride.

The vinylidene fluoride copolymer of the invention preferably contains 0.01 to 10 mol %, more preferably 0.02 to 7 mol %, and particularly preferably 0.03 to 4 mol % of structural units derived from a compound represented by Formula (A) (relative to the total of structural units derived from vinylidene fluoride and structural units derived from the compound represented by Formula (A) taken as 100 mol %). The copolymer preferably contains 90 to 99.99 mol %, more preferably 93 to 99.98 mol %, and particularly preferably 96 to 99.97 mol % of structural units derived from vinylidene fluoride.

The content of structural units derived from the compound represented by Formula (A) and the content of structural units derived from vinylidene fluoride in the inventive vinylidene fluoride copolymer may be usually determined by $^1$H NMR spectroscopy or neutralization titration of the vinylidene fluoride copolymer.

Examples of the aforementioned additional monomers include fluorine-containing monomers and hydrocarbon monomers such as ethylene and propylene copolymerizable with vinylidene fluoride, as well as monomers copolymerizable with the compounds represented by Formula (A). Examples of the fluorine-containing monomers copolymerizable with vinylidene fluoride include vinyl fluoride, trifluoroethylene, tetrafluoroethylene, chlorotrifluoroethylene, hexafluoropropylene, and perfluoroalkyl vinyl ethers such as perfluoromethyl vinyl ether. Examples of the monomers copolymerizable with the compounds represented by Formula (A) include (meth)acrylic acid and alkyl(meth)acrylate compounds such as methyl(meth)acrylate. These additional monomers may be used singly, or two or more kinds may be used in combination.

In the case where the inventive vinylidene fluoride copolymer contains structural units from the additional monomers, the content of such structural units from the additional monomers is preferably 0.01 to 10 mol % relative to the structural units from all the monomers constituting the copolymer taken as 100 mol %.

The inventive vinylidene fluoride copolymer may be obtained by copolymerizing vinylidene fluoride, a compound represented by Formula (A), and optionally an additional monomer described above.

The copolymerization methods for obtaining the inventive vinylidene fluoride copolymers are not particularly limited. However, usual methods are, for example, suspension polymerization, emulsion polymerization and solution polymerization. From the viewpoints such as easy posttreatment, aqueous suspension polymerization and emulsion polymerization are preferable, and aqueous suspension polymerization is particularly preferable.

In suspension polymerization using water as the dispersion medium, suspending agents may be used in an amount of 0.005 to 1.0 part by mass, and preferably 0.01 to 0.4 parts by mass based on 100 parts by mass of all the monomers to be copolymerized (vinylidene fluoride, compounds represented by Formula (A) and additional monomers optionally used in the copolymerization). Examples of the suspending agents include methyl cellulose, methoxymethyl cellulose, propoxymethyl cellulose, hydroxyethyl cellulose, hydroxypropyl cellulose, polyvinyl alcohol, polyethylene oxide and gelatin.

Polymerization initiators may be used, with examples including diisopropyl peroxydicarbonate, di-normal propyl peroxydicarbonate, di-normal heptafluoropropyl peroxydicarbonate, isobutyryl peroxide, di(chlorofluoroacyl) peroxide, di(perfluoroacyl) peroxide and t-butyl peroxypivalate. The amount thereof is 0.05 to 5 parts by mass, and preferably 0.15 to 2 parts by mass based on 100 parts by mass of all the monomers to be copolymerized (vinylidene fluoride, compounds represented by Formula (A) and additional monomers optionally used in the copolymerization).

The polymerization degree of the obtainable vinylidene fluoride copolymer may be controlled by adding chain transfer agents such as ethyl acetate, methyl acetate, diethyl carbonate, acetone, ethanol, n-propanol, acetaldehyde, propylaldehyde, ethyl propionate and carbon tetrachloride. When chain transfer agents are used, the amount thereof is usually 0.1 to 5 parts by mass, and preferably 0.5 to 3 parts by mass based on 100 parts by mass of all the monomers to be copolymerized (vinylidene fluoride, compounds represented by Formula (A) and additional monomers optionally used in the copolymerization).

The monomers (vinylidene fluoride, compounds represented by Formula (A) and additional monomers optionally used in the copolymerization) are usually fed to the copolymerization in a mass ratio of all the monomers to water in the range from 1:1 to 1:10, and preferably 1:2 to 1:5. The polymerization temperature T may be selected appropriately in accordance with the 10-hour half life temperature $T_{10}$ of the polymerization initiator, and is usually selected in the range of $T_{10}-25°$ C.$\leq T \leq T_{10}+25°$ C. For example, the temperatures $T_{10}$ of t-butyl peroxypivalate and diisopropyl peroxydicarbonate are 54.6° C. and 40.5° C., respectively (see the product catalogues of NOF CORPORATION). Thus, when t-butyl peroxypivalate and diisopropyl peroxydicarbonate are used as polymerization initiators, the polymerization temperature T may be selected appropriately in the range of 29.6° C.$\leq T \leq$79.6° C. and in the range of 15.5° C.$\leq T \leq$65.5° C., respectively. The polymerization time is not particularly limited. However, in view of factors such as productivity, the polymerization time is preferably not more than 100 hours. The polymerization pressure is generally an increased pressure, and preferably 2.0 to 8.0 MPa-G.

Vinylidene fluoride, compounds represented by Formula (A) and additional monomers optionally used in the copolymerization may be easily copolymerized by performing aqueous suspension polymerization under the above conditions, resulting in the inventive vinylidene fluoride copolymers.

The vinylidene fluoride copolymers of the invention preferably have an inherent viscosity in the range from 0.5 to 5.0 dl/g, and more preferably 1.0 to 4.0 dl/g. (The inherent viscosity herein refers to logarithmic viscosity at 30° C. of a solution of 4 g of the resin in 1 L of N,N-dimethylformamide. The same applies hereinafter.) The copolymers having this viscosity may be suitably used in electrode mixtures for nonaqueous electrolyte secondary batteries.

The inherent viscosity $\eta_i$ may be calculated according to the following equation based on data obtained by analyzing a polymer solution of 80 mg of the vinylidene fluoride copolymer in 20 ml of N,N-dimethylformamide, with an Ubbelohde viscometer in a thermostatic chamber at 30° C.

$$\eta_i=(1/C)\cdot\ln(\eta/\eta_0)$$

wherein $\eta$ is the viscosity of the polymer solution, $\eta_0$ is the viscosity of N,N-dimethylformamide as the solvent, and C is 0.4 g/dl.

The vinylidene fluoride copolymers preferably give an infrared absorption spectrum in which the absorbance ratio ($A_R$) represented by Equation (1) below is in the range from 0.01 to 5.0, and more preferably 0.05 to 3.0. If the ratio $A_R$ is less than 0.01, the copolymer may exhibit insufficient adhesion with respect to metal foils as collectors. On the other hand, any ratio $A_R$ exceeding 5.0 tends to result in a decrease in the resistance of the vinylidene fluoride copolymer to electrolytic solutions. For the measurement of an infrared absorption spectrum of the polymer, a hot-pressed film of the polymer is subjected to infrared absorption spectroscopy. In detail, the vinylidene fluoride copolymer is hot pressed at 200° C. to give a 30 mm×30 mm pressed sheet, and the pressed sheet is analyzed by IR spectroscopy in the range from 1500 cm$^{-1}$ to 4000 cm$^{-1}$ with infrared spectrophotometer FT-730 (manufactured by HORIBA LTD.)

$$A_R=A_{1700\text{-}1800}/A_{3023} \quad (1)$$

In Equation (1), $A_{1700\text{-}1800}$ is the absorbance at 1700-1800 cm$^{-1}$ assigned to carbonyl stretching vibration, and $A_{3023}$ is the absorbance at around 3023 cm$^{-1}$ assigned to CH stretching vibration. The ratio $A_R$ indicates the content of carbonyl groups present in the vinylidene fluoride copolymer.

In the inventive vinylidene fluoride copolymers, the randomness of structural units derived from a compound represented by Formula (A) is preferably not less than 40%, more preferably not less than 50%, and particularly preferably not less than 60%. Although details are unclear, this randomness advantageously ensures that the uniformity of polymer chains is improved so as to allow the carboxyl groups to interact with adherent more effectively.

In the present invention, the randomness is an indicator of the dispersion of structural units derived from a compound represented by Formula (A) in polymer chains of the inventive vinylidene fluoride copolymer. A lower randomness indicates that the structural units derived from a compound represented by Formula (A) tend to be present more continuously, in other words, molecules of a compound represented by Formula (A) tend to be polymerized with one another to longer chains (hereinafter, also referred to as polymer chains derived from a compound represented by Formula (A)). On the other hand, a higher randomness indicates that the structural units derived from a compound represented by Formula (A) tend to be present more independently, in other words, the structural units derived from a compound represented by Formula (A) tend to be discontinuous and bonded to structural units from vinylidene fluoride.

The randomness in the inventive vinylidene fluoride copolymers may be determined by dividing the content [mol %] of polymer chains derived from a compound represented by Formula (A) by the content [mol %] of structural units derived from the compound represented by Formula (A) (randomness [%]=content [mol %] of polymer chains from compound represented by Formula (A)/content [mol %] of structural units from compound represented by Formula (A)×100). Here, the mole percentage mol % is relative to the content of structural units from vinylidene fluoride taken as 100 mol %. The content of polymer chains derived from a compound represented by Formula (A) may be determined by $^{19}$F NMR spectroscopy, and the content of structural units derived from the compound represented by Formula (A) may be determined by, for example, $^1$H NMR spectroscopy or neutralization titration.

When the inventive vinylidene fluoride copolymer is a copolymer of vinylidene fluoride and carboxyethyl acrylate as an example, the randomness may be determined by the following method. In a $^{19}$F NMR spectrum, CF$_2$ adjacent to the carboxyethyl acrylate unit gives a peak at around −94 ppm. The mole percentage of the carboxyethyl acrylate chains is determined from an integral ratio of this peak to all the peaks in the spectrum. The randomness may be determined as a ratio of the mole percentage of the carboxyethyl acrylate chains to the mole percentage of all the structural units from carboxyethyl acrylate in the polymer measured by a method such as $^1$H NMR spectroscopy or neutralization titration (randomness [%]=mol % of carboxyethyl acrylate chains/mol % of all structural units from carboxyethyl acrylate×100).

For example, the inventive vinylidene fluoride copolymers having the above randomness may be produced by performing the aforementioned polymerization such as suspension polymerization in such a manner that a compound represented by Formula (A) is added continuously.

[Battery Electrode Binders]

A battery electrode binder according to the invention includes the inventive vinylidene fluoride copolymer and a nonaqueous solvent.

As described above, the battery electrode binder of the invention includes the vinylidene fluoride copolymer and a nonaqueous solvent. An electrode mixture for nonaqueous electrolyte secondary batteries described later may be obtained by adding an electrode active material to the binder. An electrode active material may be added to the binder in such a manner that the binder is added to the electrode active material, or the electrode active material is added to a nonaqueous solvent and mixed therewith by stirring and the binder is added to the resultant mixture.

(Nonaqueous Solvents)

The battery electrode binder of the invention contains a nonaqueous solvent. The nonaqueous solvents used herein are capable of dissolving the vinylidene fluoride copolymers. Polar solvents may be suitably used. Specific examples of the nonaqueous solvents include N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, trimethyl phosphate, acetone and cyclohexanone. N-methyl-2-pyrrolidone, N,N-dimethylformamide, N,N-dimethylacetamide and dimethylsulfoxide are preferred. The nonaqueous solvents may be used singly, or two or more kinds may be used in combination.

In the inventive battery electrode binders, the amount of the nonaqueous solvent is preferably 400 to 10000 parts by mass, and more preferably 600 to 5000 parts by mass with respect to 100 parts by mass of the vinylidene fluoride copolymer. This amount ensures that the binder has an appropriate viscosity and exhibits excellent handling properties.

[Electrode Mixtures for Nonaqueous Electrolyte Secondary Batteries]

An electrode mixture for nonaqueous electrolyte secondary batteries according to the invention includes the inventive vinylidene fluoride copolymer, an electrode active material and a nonaqueous solvent. A positive electrode mixture for nonaqueous electrolyte secondary batteries according to the invention usually includes the inventive vinylidene fluoride copolymer, a lithium-based positive electrode active material and a nonaqueous solvent. Because the inventive electrode mixture for nonaqueous electrolyte secondary batteries includes the vinylidene fluoride copolymer, an electrode for nonaqueous electrolyte secondary batteries obtained by applying the mixture to a collector and drying the coating achieves excellent adhesion between the collector and the mixture layer.

By changing the types or the like of the electrode active materials, the electrode mixtures for nonaqueous electrolyte secondary batteries of the invention may be used as mixtures for negative electrodes, namely, as negative electrode mixtures for nonaqueous electrolyte secondary batteries, or may be used as mixtures for positive electrodes, namely, as positive electrode mixtures for nonaqueous electrolyte secondary batteries. Because vinylidene fluoride copolymers generally have excellent oxidation resistance, the inventive electrode mixtures for nonaqueous electrolyte secondary batteries are preferably used as mixtures for positive electrodes.

(Electrode Active Materials)

The electrode active materials added to the inventive electrode mixtures for nonaqueous electrolyte secondary batteries are not particularly limited, and any known active materials for negative electrodes (hereinafter, also referred to as negative electrode active materials) and active materials for positive electrodes (hereinafter, also referred to as positive electrode active materials) may be used.

Examples of the negative electrode active materials include carbon materials, metal and alloy materials, and metal oxides, with carbon materials being preferred.

Examples of the carbon materials include synthetic graphites, natural graphites, non-graphitizable carbons and graphitizable carbons. The carbon materials may be used singly, or two or more kinds may be used in combination.

The use of these carbon materials allows for increasing the energy density of the obtainable batteries.

For example, the synthetic graphites may be obtained by carbonizing organic materials and heat treating the carbon products at high temperatures, followed by crushing and classification. MAG series (manufactured by Hitachi Chemical Co., Ltd.) and MCMB (manufactured by Osaka Gas Chemicals Co., Ltd.) may be used as the synthetic graphites.

For example, the non-graphitizable carbons may be obtained by calcining petroleum pitch-derived materials at 1000 to 1500° C. As the non-graphitizable carbon, CARBOTRON P (manufactured by KUREHA CORPORATION) may be used.

The specific surface area of the negative electrode active materials is preferably 0.3 to 10 m$^2$/g, and more preferably 0.6 to 6 m$^2$/g. If the specific surface area exceeds 10 m$^2$/g, the amount of electrolytic solution decomposed is so increased that the initial irreversible capacity is disadvantageously increased.

A preferred positive electrode active material is a lithium-based positive electrode active material containing at least lithium. Examples of the lithium-based positive electrode active materials include composite metal chalcogen compounds represented by the general formula LiMY$_2$ (wherein M is at least one of transition metals such as Co, Ni, Fe, Mn, Cr and V, and Y is a chalcogen element such as O or S) such as LiCoO$_2$ and LiNi$_x$Co$_{1-x}$O$_2$ (wherein 0≤x≤1); composite metal oxides with a spinel structure such as LiMn$_2$O$_4$; and olivine lithium compounds such as LiFePO$_4$. Commercial products may be used as the positive electrode active materials.

The specific surface area of the positive electrode active materials is preferably 0.05 to 50 m$^2$/g, and more preferably 0.1 to 30 m$^2$/g.

The specific surface area of the electrode active materials may be determined by a nitrogen adsorption method.

(Nonaqueous Solvents)

The inventive electrode mixtures for nonaqueous electrolyte secondary batteries contain nonaqueous solvents. Examples of the nonaqueous solvents used herein include the nonaqueous solvents mentioned above for use in the battery electrode binders. The nonaqueous solvents may be used singly, or two or more kinds may be used in combination.

The inventive electrode mixture for nonaqueous electrolyte secondary batteries includes the vinylidene fluoride copolymer, the electrode active material and the nonaqueous solvent.

In the inventive electrode mixture for nonaqueous electrolyte secondary batteries, the amount of the vinylidene fluoride copolymer is preferably 0.5 to 15 parts by mass, more preferably 1 to 10 parts by mass, and the amount of the active material is preferably 85 to 99.5 parts by mass, more preferably 90 to 99 parts by mass with respect to 100 parts by mass of the total of the vinylidene fluoride copolymer and the electrode active material. Further, the amount of the nonaqueous solvent is preferably 20 to 300 parts by mass, and more preferably 50 to 200 parts by mass with respect to 100 parts by mass of the total of the vinylidene fluoride copolymer and the electrode active material.

These amounts of the components ensure that the obtainable electrode mixture for nonaqueous electrolyte secondary batteries can produce electrodes for nonaqueous electrolyte secondary batteries with good productivity as well as that the electrodes for nonaqueous electrolyte secondary batteries produced exhibit excellent peel strength between the mixture layer and the collector.

The inventive electrode mixtures for nonaqueous electrolyte secondary batteries may contain additional components other than the vinylidene fluoride copolymers, the electrode active materials and the nonaqueous solvents. Examples of such additional components include conductive auxiliaries such as carbon blacks, and pigment dispersants such as polyvinylpyrrolidone. The additional components may include polymers other than the vinylidene fluoride copolymers. Examples of such additional polymers include vinylidene fluoride polymers such as polyvinylidene fluoride, vinylidene fluoride/hexafluoropropylene copolymer, vinylidene fluoride/trifluoroethylene copolymer, vinylidene fluoride/chlorotrifluoroethylene copolymer, vinylidene fluoride/perfluoromethyl vinyl ether copolymer, vinylidene fluoride/tetrafluoroethylene copolymer, and vinylidene fluoride/tetrafluoroethylene/hexafluoropropylene copolymer. In the case where the inventive electrode mixtures for nonaqueous electrolyte secondary batteries contain such additional polymers, the amount thereof is not more than 25 parts by mass with respect to 100 parts by mass of the vinylidene fluoride copolymer.

The inventive electrode mixtures for nonaqueous electrolyte secondary batteries usually have a viscosity of 2000 to 50000 mPa·s, and preferably 5000 to 30000 mPa·s as measured at 25° C. and 2 s$^{-1}$ shear rate with an E-type viscometer.

The inventive electrode mixtures for nonaqueous electrolyte secondary batteries may be produced by mixing the vinylidene fluoride copolymer, the electrode active material and the nonaqueous solvent into a uniform slurry. The addition sequence in the mixing is not particularly limited. In an exemplary production method, the vinylidene fluoride copolymer may be dissolved into a portion of the nonaqueous solvent to give a binder solution, and the electrode active material and the remaining portion of the nonaqueous solvent may be admixed with the binder solution by stirring to give an electrode mixture for nonaqueous electrolyte secondary batteries.

[Electrodes for Nonaqueous Electrolyte Secondary Batteries]

An electrode for nonaqueous electrolyte secondary batteries according to the invention is obtained by applying the electrode mixture for nonaqueous electrolyte secondary batteries to a collector, and drying the coating. The inventive electrode for nonaqueous electrolyte secondary batteries has a collector and a layer formed from the electrode mixture for nonaqueous electrolyte secondary batteries. When the electrode mixture for nonaqueous electrolyte secondary batteries is a negative electrode mixture for nonaqueous electrolyte secondary batteries, a negative electrode for nonaqueous electrolyte secondary batteries is obtained. When the electrode mixture for nonaqueous electrolyte secondary batteries is a positive electrode mixture for nonaqueous electrolyte secondary batteries, a positive electrode for nonaqueous electrolyte secondary batteries is obtained. Because vinylidene fluoride copolymers generally have excellent oxidation resistance, the inventive electrodes for nonaqueous electrolyte secondary batteries are preferably used as positive electrodes for nonaqueous electrolyte secondary batteries.

In the invention, the term "mixture layer" refers to a layer of electrode mixture for nonaqueous electrolyte secondary batteries that is formed by applying the electrode mixture for nonaqueous electrolyte secondary batteries to a collector followed by drying.

Copper is an exemplary collector used in the invention for the production of negative electrodes for nonaqueous electrolyte secondary batteries. Examples of the shapes thereof include metal foils and metal screens. In order to produce negative electrodes for nonaqueous electrolyte secondary batteries, copper foils are preferably used as the collectors.

Aluminum is an exemplary collector used in the invention for the production of positive electrodes for nonaqueous electrolyte secondary batteries. Examples of the shapes thereof include metal foils and metal screens. In order to produce positive electrodes for nonaqueous electrolyte secondary batteries, aluminum foils are preferably used as the collectors.

The thickness of the collectors is usually 5 to 100 μm, and preferably 5 to 20 μm.

The thickness of the mixture layers is usually 20 to 250 μm, and preferably 20 to 150 μm. The basis weight of the mixture layers is usually 20 to 700 g/m$^2$, and preferably 30 to 500 g/m$^2$.

In the production of the inventive electrodes for nonaqueous electrolyte secondary batteries, the electrode mixture for nonaqueous electrolyte secondary batteries is applied to at least one surface, preferably both surfaces of the collectors. The application methods are not particularly limited. Exemplary methods include bar coating, die coating and comma coating.

After the application, drying is usually performed at temperatures of 50 to 150° C. for 1 to 300 minutes. The pressure during the drying is not particularly limited, but is usually atmospheric pressure or reduced pressure.

A heat treatment may be performed after drying. The heat treatment may be usually carried out at temperatures of 100 to 250° C. for 1 to 300 minutes. The temperatures in the heat treatment overlap with the drying temperatures. That is, these steps may be separate steps or may be performed as a continuous step.

Further, a press treatment may be carried out. The press treatment may be usually performed at 1 to 200 MPa-G. Performing the press treatment is preferable because the electrode density can be increased.

The inventive electrodes for nonaqueous electrolyte secondary batteries may be manufactured as described above. When the electrode mixture for nonaqueous electrolyte secondary batteries is applied to one surface of the collector, the electrode for nonaqueous electrolyte secondary batteries is a two-layer stack, namely, a mixture layer/collector stack. When the electrode mixture for nonaqueous electrolyte secondary batteries is applied to both surfaces of the collector, the electrode for nonaqueous electrolyte secondary batteries is a three-layer stack, namely, a mixture layer/collector/mixture layer stack.

Because of the use of the inventive electrode mixture for nonaqueous electrolyte secondary batteries, the electrodes for nonaqueous electrolyte secondary batteries of the invention exhibit excellent peel strength between the collector and the mixture layer. Such high peel strength suppresses the occurrence of cracks or separation in the electrodes during steps such as pressing, slitting and winding, thus leading to improved productivity.

As described above, the inventive electrodes for nonaqueous electrolyte secondary batteries are excellent in terms of peel strength between the collector and the mixture layer. In detail, higher peel strength can be achieved as compared to electrodes utilizing conventional vinylidene fluoride homopolymers or conventional vinylidene fluoride copolymers in place of the inventive vinylidene fluoride copolymers. In the case where the inventive electrodes for nonaqueous electrolyte secondary batteries are positive electrodes, the peel strength may be determined by a 90° peel test in accordance with JIS K6854-1. When the inventive electrodes for nonaqueous electrolyte secondary batteries are negative electrodes, the peel strength may be determined by a 180° peel test in accordance with JIS K6854-2.

[Nonaqueous Electrolyte Secondary Batteries]

A nonaqueous electrolyte secondary battery according to the invention has the aforementioned electrode for nonaqueous electrolyte secondary batteries.

The nonaqueous electrolyte secondary batteries of the invention are not particularly limited provided that they have the electrodes for nonaqueous electrolyte secondary batteries. In an embodiment, the nonaqueous electrolyte secondary batteries have the electrodes for nonaqueous electrolyte secondary batteries, preferably the positive electrodes for nonaqueous electrolyte secondary batteries, as well as known members other than the electrodes for nonaqueous electrolyte secondary batteries, for example, known separators.

EXAMPLES

The present invention will be described in greater detail by presenting examples hereinbelow without limiting the scope of the invention.

Example 1

Polymerization was performed in the following manner to produce a vinylidene fluoride copolymer as a polymer powder.

A 2 L autoclave was charged with 900 g of ion exchanged water, 0.4 g of METOLOSE 90SH-100 (manufactured by Shin-Etsu Chemical Co., Ltd.) as a cellulose-based suspending agent, 0.2 g of carboxyethyl acrylate, 2.0 g of a 50 wt % t-butyl peroxypivalate/CFC 225cb solution, and 396 g of vinylidene fluoride. The temperature was raised to 50° C. in 2 hours.

While maintaining the temperature at 50° C., a 15 g/L aqueous solution of carboxyethyl acrylate was gradually added at such a rate that the polymerization pressure became constant. The total amount of carboxyethyl acrylate including the initial charge was 4.0 g.

The polymerization was terminated simultaneously with the completion of the addition of the aqueous carboxyethyl acrylate solution. The total polymerization time from the initiation of heating was 8.6 hours.

After the completion of the polymerization, the polymer slurry was heat treated at 95° C. for 60 minutes, dewatered, washed with water, and dried at 80° C. for 20 hours to give a polymer powder. The yield of the polymer was 39%. The inherent viscosity of the obtained polymer was 3.12 dl/g. The absorbance ratio ($A_R$) of the polymer was 1.10.

Figure 1:
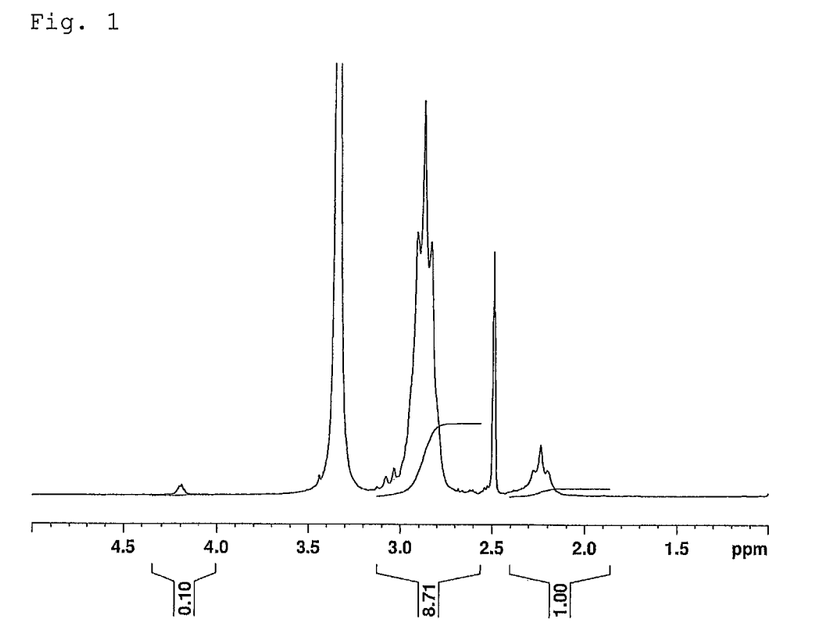
FIG. 1 is a $^1$H NMR spectrum of a vinylidene fluoride copolymer obtained in Example 1.

A $^1$H NMR spectrum of the polymer powder was recorded under the following conditions. The obtained $^1$H NMR spectrum is illustrated in FIG. 1.

Apparatus: AVANCE AC 400 FT NMR SPECTROMETER manufactured by Bruker

Measurement Conditions:

Frequency: 400 MHz

Measurement solvent: DMSO-$d_6$

Measurement temperature: 25° C.

The $^1$H NMR spectrum was analyzed to determine the contents of structural units derived from vinylidene fluoride and of structural units derived from carboxyethyl acrylate in the polymer, based on the integral intensities of the signal at 4.19 ppm mainly assigned to carboxyethyl acrylate and of the signals at 2.24 ppm and 2.87 ppm mainly assigned to vinylidene fluoride.

In the vinylidene fluoride copolymer, the content of structural units from vinylidene fluoride (VDF content: mol %) was 98.95 mol % and the content of structural units from carboxyethyl acrylate (CEA content: mol %) was 1.05 mol %.

A $^{19}$F NMR spectrum of the polymer powder was recorded under the following conditions.

Apparatus: AVANCE AC 400 FT NMR SPECTROMETER manufactured by Bruker

Measurement conditions:

Frequency: 376 MHz

Measurement solvent: DMSO-$d_6$

Measurement temperature: 25° C.

The $^{19}$F NMR spectrum was analyzed to determine the content of polymer chains derived from carboxyethyl acrylate in the polymer. In detail, the intensity of peak(s) (an integral value) at around −94 ppm assigned to the fluorine atoms present in the vinylidene fluoride-derived structural units adjacent to the carboxyethyl acrylate units was divided by the intensity of all the peaks assigned to the fluorine atoms in the spectrum. The content of polymer chains derived from carboxyethyl acrylate in the vinylidene fluoride copolymer was thus found to be 0.71 mol %.

Based on the CEA content and the content of polymer chains derived from carboxyethyl acrylate, the randomness in the vinylidene fluoride copolymer was calculated to be 68%.

Examples 2 and 3

Polymer powders were obtained in the same manner as in Example 1, except that the concentration and amount of the aqueous carboxyethyl acrylate solution, the amount of the initiator, and the polymerization conditions were changed as described in Table 1. The polymer yields were 71% in Example 2 and 25% in Example 3. The inherent viscosities of the polymers were 3.15 dl/g in Example 2 and 2.65 dl/g in Example 3. The absorbance ratios ($A_R$) of the polymers were 0.70 in Example 2 and 2.57 in Example 3.

$^1$H NMR spectra and $^{19}$F NMR spectra of the polymer powders were recorded in the same manner as in Example 1. The VDF contents and the CEA contents in the polymers were obtained from the integral intensities in the $^1$H NMR spectra similarly to Example 1. Further, the contents of polymer chains derived from carboxyethyl acrylate were obtained from the $^{19}$F NMR spectra similarly to Example 1, and the randomness were calculated based on the CEA contents and the contents of polymer chains derived from carboxyethyl acrylate.

The vinylidene fluoride copolymer obtained in Example 2 was found to have a VDF content of 99.39 mol %, a CEA content of 0.61 mol %, a content of carboxyethyl acrylate-derived polymer chains of 0.38 mol %, and a randomness of 62%. The vinylidene fluoride copolymer obtained in Example 3 was found to have a VDF content of 97.28 mol %, a CEA content of 2.72 mol %, a content of carboxyethyl acrylate-derived polymer chains of 1.41 mol %, and a randomness of 52%.

Examples 4 and 5

Polymer powders were obtained in the same manner as in Example 1, except that carboxyethyl acrylate was replaced by acryloyloxyethyl succinate as well as that the concentration and amount of the aqueous acryloyloxyethyl succinate solution, the amount of the initiator, and the polymerization conditions described in Table 1 were adopted. The polymer yields were 70% in Example 4 and 37% in Example 5. The inherent viscosities of the polymers were 2.83 dl/g in Example 4 and 3.16 dl/g in Example 5. The absorbance ratios ($A_R$) of the polymers were 0.72 in Example 4 and 1.49 in Example 5.

Figure 2:
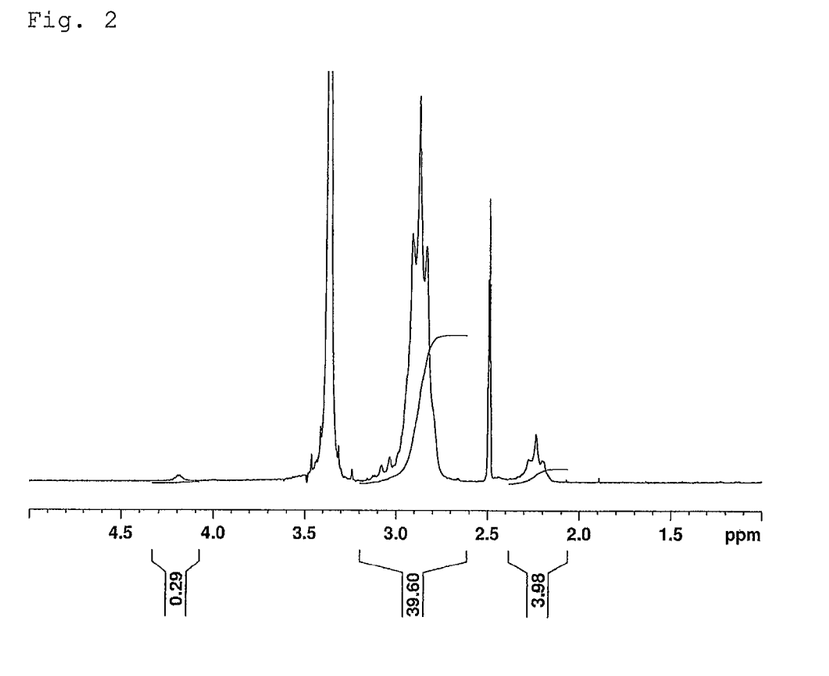
FIG. 2. is a $^1$H NMR spectrum of a vinylidene fluoride copolymer obtained in Example 4.

$^1$H NMR spectra of the polymer powders were recorded in the same manner as in Example 1. The obtained $^1$H NMR spectrum of the polymer powder from Example 4 is illustrated in FIG. 2.

The $^1$H NMR spectrum was analyzed to determine the contents of structural units derived from vinylidene fluoride and of structural units derived from acryloyloxyethyl succinate in the polymer, based on the integral intensities of the signal at 4.18 ppm mainly assigned to acryloyloxyethyl succinate and of the signals at 2.23 ppm and 2.87 ppm mainly assigned to vinylidene fluoride.

In the vinylidene fluoride copolymer, the content of structural units from vinylidene fluoride (VDF content: mol %) was 99.67 mol % and the content of structural units from acryloyloxyethyl succinate (AES content: mol %) was 0.33 mol %.

$^{19}$F NMR spectra of the polymer powders were recorded in the same manner as in Example 1.

To determine the content of polymer chains derived from acryloyloxyethyl succinate in the polymer from Example 4, the $^{19}$F NMR spectrum was analyzed. In detail, the intensity of peak(s) (an integral value) at around −94 ppm assigned to the fluorine atoms present in the vinylidene fluoride-derived structural units adjacent to the acryloyloxyethyl succinate units was divided by the intensity of all the peaks assigned to the fluorine atoms in the spectrum. The content of polymer chains derived from acryloyloxyethyl succinate in the vinylidene fluoride copolymer was thus found to be 0.248 mol %.

Based on the AES content and the content of polymer chains derived from acryloyloxyethyl succinate, the randomness in the vinylidene fluoride copolymer was calculated to be 75%.

The VDF content and the AES content in the polymer from Example 5 were determined based on the integral intensities in the $^1$H NMR spectrum similarly to Example 4. Further, the content of polymer chains derived from acryloyloxyethyl succinate in the polymer from Example 5 was determined from the $^{19}$F NMR spectrum similarly to Example 4. The randomness was calculated based on the AES content and the content of polymer chains derived from acryloyloxyethyl succinate.

The vinylidene fluoride copolymer obtained in Example 5 was found to have a VDF content of 99.00 mol %, an AES content of 1.00 mol %, a content of acryloyloxyethyl succinate-derived polymer chains of 0.56 mol %, and a randomness of 56%.

Example 6

A 2 L autoclave was charged with 925 g of ion exchanged water, 0.65 g of METOLOSE SM-100 (manufactured by Shin-Etsu Chemical Co., Ltd.) as a cellulose-based suspending agent, 0.22 g of acryloyloxyethyl succinate, 4.3 g of a 50 wt % diisopropyl peroxydicarbonate/CFC 225cb solution, and 421 g of vinylidene fluoride. The temperature was raised to 26° C. in 1 hour.

While maintaining the temperature at 26° C., a 30 g/L aqueous solution of acryloyloxyethyl succinate was gradually added at a rate of 0.19 g/min. The total amount of acryloyloxyethyl succinate including the initial charge was 2.92 g.

The polymerization was terminated simultaneously with the completion of the addition of the aqueous acryloyloxyethyl succinate solution. The total polymerization time from the initiation of heating was 9.1 hours.

After the completion of the polymerization, the polymer slurry was heat treated at 95° C. for 60 minutes, dewatered, washed with water, and dried at 80° C. for 20 hours to give a polymer powder. The yield of the polymer was 33%. The inherent viscosity of the obtained polymer was 2.30 dl/g. The absorbance ratio ($A_R$) of the polymer was 0.93.

A $^1$H NMR spectrum and a $^{19}$F NMR spectrum of the polymer powder were recorded in the same manner as in Example 1. The VDF content and the AES content in the polymer were obtained from the integral intensities in the $^1$H NMR spectrum similarly to Example 4. Further, the content of polymer chains derived from acryloyloxyethyl succinate in the polymer was obtained from the $^{19}$F NMR spectrum similarly to Example 4, and the randomness was calculated based on the AES content and the content of polymer chains derived from acryloyloxyethyl succinate.

The vinylidene fluoride copolymer obtained in Example 6 was found to have a VDF content of 99.53 mol %, an AES content of 0.47 mol %, a content of acryloyloxyethyl succinate-derived polymer chains of 0.37 mol %, and a randomness of 78%.

Example 7

A polymer powder was obtained in the same manner as in Example 1, except that carboxyethyl acrylate was replaced by acryloyloxyethyl succinate as well as that the concentration and amount of the aqueous acryloyloxyethyl succinate solution, the amount of the initiator, and the polymerization conditions described in Table 1 were adopted. The polymer yield was 64%. The inherent viscosity of the polymer was 1.79 dl/g. The absorbance ratio ($A_R$) of the polymer was 0.76.

A $^1$H NMR spectrum and a $^{19}$F NMR spectrum of the polymer powder were recorded in the same manner as in Example 1. The VDF content and the AES content in the polymer were obtained from the integral intensities in the $^1$H NMR spectrum similarly to Example 4. Further, the content of polymer chains derived from acryloyloxyethyl succinate in the polymer was obtained from the $^{19}$F NMR spectrum similarly to Example 4, and the randomness was calculated based on the AES content and the content of polymer chains derived from acryloyloxyethyl succinate.

The vinylidene fluoride copolymer obtained in Example 7 was found to have a VDF content of 99.7 mol %, an AES content of 0.3 mol %, a content of acryloyloxyethyl succinate-derived polymer chains of 0.28 mol %, and a randomness of 94%.

Example 8

A 2 L autoclave was charged with 1000 g of ion exchanged water, 0.6 g of METOLOSE SM-100 (manufactured by Shin-Etsu Chemical Co., Ltd.) as a cellulose-based suspending agent, 0.2 g of acryloyloxyethyl succinate, 6 g of a 50 wt % diisopropyl peroxydicarbonate/CFC 225cb solution, 400 g of vinylidene fluoride, and 8 g of ethyl acetate. The temperature was raised to 26° C. in 1 hour.

While maintaining the temperature at 26° C., a 100 g/L aqueous solution of acryloyloxyethyl succinate was gradually added at a rate of 0.05 g/min. The total amount of acryloyloxyethyl succinate including the initial charge was 1.48 g.

The polymerization was terminated simultaneously with the completion of the addition of the aqueous acryloyloxyethyl succinate solution. The total polymerization time from the initiation of heating was 7.7 hours.

After the completion of the polymerization, the polymer slurry was heat treated at 95° C. for 60 minutes, dewatered, washed with water, and dried at 80° C. for 20 hours to give a polymer powder. The yield of the polymer was 35%. The inherent viscosity of the obtained polymer was 1.29 dl/g. The absorbance ratio ($A_R$) of the polymer was 0.68.

A $^1$H NMR spectrum and a $^{19}$F NMR spectrum of the polymer powder were recorded in the same manner as in Example 1. The VDF content and the AES content in the polymer were obtained from the integral intensities in the $^1$H NMR spectrum similarly to Example 4. Further, the content of polymer chains derived from acryloyloxyethyl succinate in the polymer was obtained from the $^{19}$F NMR spectrum similarly to Example 4, and the randomness was calculated based on the AES content and the content of polymer chains derived from acryloyloxyethyl succinate.

The vinylidene fluoride copolymer obtained in Example 7 was found to have a VDF content of 99.7 mol %, an AES content of 0.3 mol %, a content of acryloyloxyethyl succinate-derived polymer chains of 0.23 mol %, and a randomness of 77%.

Comparative Example 1

A polymer powder was obtained in the same manner as in Example 1, except that carboxyethyl acrylate was replaced by acrylic acid as well as that the concentration of the acrylic acid aqueous solution, and the polymerization conditions described in Table 1 were adopted. The polymer yield was 50%. The inherent viscosity of the polymer was 2.66 dl/g. The absorbance ratio ($A_R$) of the polymer was 1.66.

The content of structural units derived from acrylic acid in the polymer was determined by neutralization titration using a 0.03 mol/L aqueous sodium hydroxide solution. In detail, 0.3 g of the polymer was dissolved in 9.7 g of acetone at about 80° C. The resultant solution was combined with 3 g of pure water, thereby preparing a titration solution. With the use of phenolphthalein as the indicator, the titration solution was titrated to neutrality against a 0.03 mol/L aqueous sodium hydroxide solution at room temperature.

The content of structural units derived from vinylidene fluoride was calculated based on the relationship between the content of acrylic acid-derived structural units determined by the neutralization titration and the total amount of the polymer subjected to the neutralization titration.

In the vinylidene fluoride copolymer, the content of structural units derived from vinylidene fluoride (VDF content: mol %) was 98.18 mol % and the content of structural units from acrylic acid (AA content: mol %) was 1.82 mol %.

A $^{19}$F NMR spectrum of the polymer powder was recorded in the same manner as in Example 1.

The $^{19}$F NMR spectrum was analyzed to determine the content of polymer chains derived from acrylic acid in the polymer from Comparative Example 1. In detail, the intensity of peak(s) (an integral value) at around −94 ppm assigned to the fluorine atoms present in the vinylidene fluoride-derived structural units adjacent to the acrylic acid was divided by the intensity of all the peaks assigned to the fluorine atoms in the spectrum. The content of polymer chains derived from acrylic acid in the vinylidene fluoride copolymer was thus found to be 1.57 mol %.

Based on the AA content and the content of polymer chains derived from acrylic acid, the randomness in the vinylidene fluoride copolymer was calculated to be 85%.

Comparative Example 2

A polymer powder was obtained in the same manner as in Example 1, except that carboxyethyl acrylate was replaced by monomethyl maleate as well as that the concentration of the aqueous monomethyl maleate solution, and the polymerization conditions described in Table 1 were adopted. The polymer yield was 47%. The inherent viscosity of the polymer was 2.06 dl/g. The absorbance ratio ($A_R$) of the polymer was 0.55.

Comparative Example 3

A polymer powder was obtained in the same manner as in Example 1, except that carboxyethyl acrylate was replaced by acrylic acid as well as that the concentration of the acrylic acid aqueous solution, and the polymerization conditions described in Table 1 were adopted. The polymer yield was 41%. The inherent viscosity of the polymer was 1.49 dl/g. The absorbance ratio ($A_R$) of the polymer was 1.63.

The VDF content and the AA content in the polymer from Comparative Example 3 were determined by neutralization titration similarly to Comparative Example 1. Further, the content of AA-derived polymer chains in the polymer from Comparative Example 3 was obtained from a $^{19}$F NMR spectrum similarly to Comparative Example 1, and the randomness was calculated based on the AA content and the content of AA-derived polymer chains.

The vinylidene fluoride copolymer obtained in Comparative Example 3 was found to have a VDF content of 98.23 mol %, an AA content of 1.77 mol %, a content of AA-derived polymer chains of 1.73 mol %, and a randomness of 96%.

Comparative Example 4

A polymer powder was obtained in the same manner as in Example 1, except that carboxyethyl acrylate was replaced by hydroxyethyl acrylate as well as that the concentration of the aqueous hydroxyethyl acrylate solution, and the polymerization conditions described in Table 1 were adopted. The polymer yield was 59%. The inherent viscosity of the polymer was 1.77 dl/g. The absorbance ratio ($A_R$) of the polymer was 0.36.

A $^1H$ NMR spectrum was analyzed to determine the contents of structural units derived from vinylidene fluoride and of structural units derived from hydroxyethyl acrylate in the polymer, based on the integral intensities of the signal at 4.00 ppm mainly assigned to hydroxyethyl acrylate and of the signals at 2.23 ppm and 2.88 ppm mainly assigned to vinylidene fluoride.

In the vinylidene fluoride copolymer, the content of structural units from vinylidene fluoride (VDF content: mol %) was 99.65 mol % and the content of structural units from hydroxyethyl acrylate (HEA content: mol %) was 0.35 mol %.

A $^{19}F$ NMR spectrum of the polymer powder was recorded in the same manner as in Example 1.

The $^{19}F$ NMR spectrum was analyzed to determine the content of polymer chains derived from hydroxyethyl acrylate in the polymer. In detail, the intensity of peak(s) (an integral value) at around −94 ppm assigned to the fluorine atoms present in the vinylidene fluoride-derived structural units adjacent to the hydroxyethyl acrylate units was divided by the intensity of all the peaks assigned to the fluorine atoms in the spectrum. The content of polymer chains derived from hydroxyethyl acrylate in the vinylidene fluoride copolymer was thus found to be 0.35 mol %.

Based on the HEA content and the content of polymer chains derived from hydroxyethyl acrylate, the randomness in the vinylidene fluoride copolymer was calculated to be 100%.

Comparative Example 5

A 2 L autoclave was charged with 1096 g of ion exchanged water, 0.214 g of METOLOSE SM-100, 1.28 g of a 50 wt % diisopropyl peroxydicarbonate/CFC 225cb solution, 428 g of vinylidene fluoride, and 1.92 g of ethyl acetate. The temperature was raised to 26° C. in 1 hour.

While maintaining the temperature at 26° C., the reaction was carried out for a total time of 18.7 hours from the initiation of heating.

After the completion of the polymerization, the polymer slurry was heat treated at 95° C. for 60 minutes, dewatered, washed with water, and dried at 80° C. for 20 hours to give a polymer powder. The yield of the polymer was 90%. The inherent viscosity of the obtained polymer was 3.30 dl/g.

Comparative Example 6

A 2 L autoclave was charged with 1020 g of ion exchanged water, 0.2 g of METOLOSE SM-100, 2.8 g of a 50 wt % diisopropyl peroxydicarbonate/CFC 225cb solution, 400 g of vinylidene fluoride, and 2.8 g of ethyl acetate. The temperature was raised to 26° C. in 1 hour.

While maintaining the temperature at 26° C., the reaction was carried out for a total time of 15.3 hours from the initiation of heating.

After the completion of the polymerization, the polymer slurry was heat treated at 95° C. for 60 minutes, dewatered, washed with water, and dried at 80° C. for 20 hours to give a polymer powder. The yield of the polymer was 87%. The inherent viscosity of the obtained polymer was 2.14 dl/g.

[Peel Test (Positive Electrodes)]

A positive electrode mixture in the form of slurry was prepared by dispersing 100 parts by mass of lithium cobalt oxide (CELLSEED C5H manufactured by Nippon Chemical Industrial Co., LTD.), 2 parts by mass of carbon black (DENKA BLACK manufactured by DENKI KAGAKU KOGYO KABUSHIKI KAISHA) and 2 parts by mass of the vinylidene fluoride copolymer (any of the polymer powders obtained in Examples and Comparative Examples) in N-methyl-2-pyrrolidone. The amount of N-methyl-2-pyrrolidone added was adjusted appropriately depending on the inherent viscosity of the vinylidene fluoride copolymer such that the viscosity of the resultant mixture became 5000 to 30000 mPa·s as measured at 25° C. and 2 s$^{-1}$ shear rate with an E-type viscometer.

The positive electrode mixture was applied onto a 15 μm thick aluminum foil with a bar coater, and the coating was dried at 110° C. for 30 minutes. Thus, a one side-coated electrode (a positive electrode) with a one-side basis weight of 200 g/m$^2$ was fabricated.

The one side-coated electrode (the positive electrode) with a one-side basis weight of 200 g/m$^2$ was cut to 100 mm in length and 20 mm in width. The piece was subjected to a 90° peel test in accordance with JIS K6854-1 with a tensile tester (STA-1150 UNIVERSAL TESTING MACHINE manufactured by ORIENTEC) at a head speed of 10 mm/min, thereby measuring the peel strength (of the positive electrode).

[Peel Test (Negative Electrodes)]

A negative electrode mixture was prepared by mixing 96 parts by weight of synthetic graphite (MCMB 25-28 manufactured by Osaka Gas Chemicals Co., Ltd.) and 4 parts by weight of the vinylidene fluoride copolymer (any of the polymer powders obtained in Examples and Comparative Examples) in N-methyl-2-pyrrolidone (NMP) as a solvent. The amount of NMP added was adjusted appropriately depending on the inherent viscosity of the vinylidene fluoride copolymer such that the viscosity of the resultant mixture became 5000 to 30000 mPa·s as measured at 25° C. and 2 s$^{-1}$ shear rate with an E-type viscometer.

The negative electrode mixture was applied onto one surface of a surface-treated copper foil having a thickness of about 10 μm with a bar coater such that the one-side basis weight after drying would be 150 g/cm$^2$. The coating was dried at 110° C. for 30 minutes. Thus, a one side-coated electrode (a negative electrode) was fabricated. The one side-coated electrode (the negative electrode) was cut to 50 mm in length and 20 mm in width. The piece was subjected to a 180° peel test in accordance with JIS K6854-2 with a tensile tester (STA-1150 UNIVERSAL TESTING MACHINE manufactured by ORIENTEC) at a head speed of 200 mm/min, thereby measuring the peel strength (of the negative electrode).

The results are described in Table 1.

In Table 1 (Tables 1-1, 1-2, 1-3 and 1-4), VDF indicates vinylidene fluoride, CEA indicates carboxyethyl acrylate, 50 wt % PB/PV CFC solution indicates 50 wt % t-butyl peroxypivalate/CFC 225cb solution, 50 wt % IPP/CFC solution indicates 50 wt % diisopropyl peroxydicarbonate/

CFC 225cb solution, 90SH-100 indicates METOLOSE 90SH-100, SM-100 indicates METOLOSE SM-100, AES indicates acryloyloxyethyl succinate, AA indicates acrylic acid, MMM indicates monomethyl maleate, and HEA indicates hydroxyethyl acrylate. In Table 1, parts are parts by mass.

TABLE 1-1

| | | Ex. 1 | Ex. 2 | Ex. 3 | Ex. 4 |
|---|---|---|---|---|---|
| Materials and amounts | VDF/parts | 99 | 99 | 99 | 99 |
| | Comonomer | CEA | CEA | CEA | AES |
| | Initial charge/parts | 0.05 | 0.05 | 0.05 | 0.05 |
| | Subsequent charge/parts | 0.95 | 0.9 | 1.43 | 0.95 |
| | Concentration of aqueous comonomer solution added afterward [g/L] | 15 | 7.5 | 30 | 7.5 |
| | Water/parts | 225 | 225 | 225 | 225 |
| | Initiator | 50 wt % PB/PV CFC solution | 50 wt % PB/PV CFC solution | 50 wt % PB/PV CFC solution | 50 wt % PB/PV CFC solution |
| | Amount of initiator/parts | 0.50 | 0.80 | 0.50 | 1.00 |
| | Chain transfer agent ethyl acetate/parts | — | — | — | — |
| | Suspending agent | 90SH-100 | 90SH-100 | 90SH-100 | 90SH-100 |
| | Amount of suspending agent/parts | 0.1 | 0.1 | 0.1 | 0.1 |
| Polymerization conditions | Polymerization temp. [° C.] | 50 | 50 | 50 | 50 |
| | Rotational speed for stirring [rpm] | 600 | 600 | 600 | 600 |
| | Conditions for subsequent addition of comonomer | Constant pressure | Constant pressure | Constant pressure | Constant pressure |
| | Initial pressure [MPa-G] | 6.23 | 6.23 | 6.25 | 6.21 |
| | Final pressure [MPa-G] | 6.03 | 6.16 | 6.25 | 6.18 |
| | Polymerization time [hr] | 8.6 | 7.9 | 13.1 | 6.3 |
| | Yield [%] | 39% | 71% | 25% | 70% |
| Polymer properties | Inherent viscosity [dl/g] | 3.12 | 3.15 | 2.65 | 2.83 |
| | Absorbance ($A_R$) | 1.10 | 0.70 | 2.57 | 0.72 |
| | Randomness [%] | 68 | 62 | 52 | 75 |
| Peel strength (positive electrode) [gf · mm$^{-1}$] | | 3.78 | 3.52 | 3.75 | 4.07 |
| Peel strength (negative electrode) [gf · mm$^{-1}$] | | — | — | 13.12 | 15.59 |

TABLE 1-2

| | | Ex. 5 | Ex. 6 | Ex. 7 | Ex. 8 |
|---|---|---|---|---|---|
| Materials and amounts | VDF/parts | 99 | 99 | 99 | 100 |
| | Comonomer | AES | AES | AES | AES |
| | Initial charge/parts | 0.05 | 0.05 | 0.05 | 0.05 |
| | Subsequent charge/parts | 1.39 | 0.63 | 0.8 | 0.32 |
| | Concentration of aqueous comonomer solution added afterward [g/L] | 22.5 | 30 | 6.5 | 100 |
| | Water/parts | 225 | 215 | 225 | 250 |
| | Initiator | 50 wt % PB/PV CFC solution | 50 wt % IPP/CFC solution | 50 wt % PB/PV CFC solution | 50 wt % IPP/CFC solution |
| | Amount of initiator/parts | 0.50 | 1.00 | 2.10 | 1.50 |
| | Chain transfer agent ethyl acetate/parts | — | — | — | 2.00 |
| | Suspending agent | 90SH-100 | SM-100 | 90SH-100 | SM-100 |
| | Amount of suspending agent/parts | 0.1 | 0.15 | 0.1 | 0.15 |
| Polymerization conditions | Polymerization temp. [° C.] | 50 | 26 | 50 | 26 |
| | Rotational speed for stirring [rpm] | 600 | 600 | 600 | 600 |
| | Conditions for subsequent addition of comonomer | Constant pressure | 0.19 g/min | Constant pressure | 0.05 g/min |
| | Initial pressure [MPa-G] | 6.26 | 4.09 | 6.15 | 3.99 |
| | Final pressure [MPa-G] | 6.09 | 4.1 | 6.17 | 3.95 |
| | Polymerization time [hr] | 9.6 | 9.1 | 6.3 | 7.7 |
| | Yield [%] | 37% | 33% | 64% | 35% |
| Polymer properties | Inherent viscosity [dl/g] | 3.16 | 2.30 | 1.79 | 1.29 |
| | Absorbance ($A_R$) | 1.49 | 0.93 | 0.76 | 0.68 |
| | Randomness [%] | 56 | 78 | 94 | 77 |
| Peel strength (positive electrode) [gf · mm$^{-1}$] | | 3.38 | 2.89 | 2.90 | 1.81 |
| Peel strength (negative electrode) [gf · mm$^{-1}$] | | — | — | 10.33 | — |

TABLE 1-3

| | | Comp. Ex. 1 | Comp. Ex. 2 | Comp. Ex. 3 | Comp. Ex. 4 |
|---|---|---|---|---|---|
| Materials and amounts | VDF/parts | 99 | 99 | 99 | 99 |
| | Comonomer | AA | MMM | AA | HEA |
| | Initial charge/parts | 0.05 | 0.05 | 0.2 | 0.05 |
| | Subsequent charge/parts | 0.95 | 0.69 | 0.8 | 0.45 |

TABLE 1-3-continued

|  |  | Comp. Ex. 1 | Comp. Ex. 2 | Comp. Ex. 3 | Comp. Ex. 4 |
|---|---|---|---|---|---|
|  | Concentration of aqueous comonomer solution added afterward [g/L] | 10 | 7.5 | 10 | 4.5 |
|  | Water/parts | 225 | 225 | 225 | 225 |
|  | Initiator | 50 wt % PB/PV CFC solution | 50 wt % PB/PV CFC solution | 50 wt % PB/PV CFC solution | 50 wt % PB/PV CFC solution |
|  | Amount of initiator/parts | 0.50 | 0.50 | 1.50 | 0.3 |
|  | Chain transfer agent ethyl acetate/parts | — | — | — | — |
|  | Suspending agent | 90SH-100 | 90SH-100 | 90SH-100 | 90SH-100 |
|  | Amount of suspending agent/parts | 0.1 | 0.1 | 0.1 | 0.1 |
| Polymerization conditions | Polymerization temp. [° C.] | 50 | 50 | 50 | 50 |
|  | Rotational speed for stirring [rpm] | 600 | 600 | 600 | 600 |
|  | Conditions for subsequent addition of comonomer | Constant pressure | Constant pressure | Constant pressure | Constant pressure |
|  | Initial pressure [MPa-G] | 6.28 | 6.27 | 6.17 | 6.44 |
|  | Final pressure [MPa-G] | 6.26 | 6.26 | 6.17 | 6.43 |
|  | Polymerization time [hr] | 14.2 | 15.7 | 12.8 | 15.3 |
|  | Yield [%] | 50% | 47% | 41% | 59% |
| Polymer properties | Inherent viscosity [dl/g] | 2.66 | 2.06 | 1.49 | 1.77 |
|  | Absorbance ($A_R$) | 1.66 | 0.55 | 1.63 | 0.36 |
|  | Randomness [%] | 85 | — | 96 | 100 |
| Peel strength (positive electrode) [gf · mm$^{-1}$] |  | 2.24 | 1.48 | 1.16 | 0.95 |
| Peel strength (negative electrode) [gf · mm$^{-1}$] |  | — | — | — | 0.78 |

TABLE 1-4

|  |  | Comp. Ex. 5 | Comp. Ex. 6 |
|---|---|---|---|
| Materials and amounts | VDF/parts | 100 | 100 |
|  | Comonomer | — | — |
|  | Initial charge/parts | — | — |
|  | Subsequent charge/parts | — | — |
|  | Concentration of aqueous comonomer solution added afterward [g/L] | — | — |
|  | Water/parts | 256 | 255 |
|  | Initiator | 50 wt % IPP/CFC solution | 50 wt % IPP/CFC solution |
|  | Amount of initiator/parts | 0.30 | 0.70 |
|  | Chain transfer agent ethyl acetate/parts | 0.45 | 0.70 |
|  | Suspending agent | SM-100 | SM-100 |
|  | Amount of suspending agent/parts | 0.05 | 0.05 |
| Polymerization conditions | Polymerization temp. [° C.] | 26 | 26 |
|  | Rotational speed for stirring [rpm] | 600 | 600 |
|  | Conditions for subsequent addition of comonomer | — | — |
|  | Initial pressure [MPa-G] | 4.10 | 4.12 |
|  | Final pressure [MPa-G] | 1.5 | 1.62 |
|  | Polymerization time [hr] | 18.7 | 15.3 |
|  | Yield [%] | 90% | 87% |
| Polymer properties | Inherent viscosity [dl/g] | 3.30 | 2.14 |
|  | Absorbance ($A_R$) | — | — |
|  | Randomness [%] | — | — |
| Peel strength (positive electrode) [gf · mm$^{-1}$] |  | 1.08 | 0.56 |
| Peel strength (negative electrode) [gf · mm$^{-1}$] |  | 0.16 | — |

The invention claimed is:

1. A vinylidene fluoride copolymer obtained by copolymerizing vinylidene fluoride with a compound represented by Formula (3) below:

(3)

in Formula (3), $R^1$, $R^2$ and $R^3$ are each independently a hydrogen atom, a chlorine atom or an alkyl group having 1 to 5 carbon atoms; and $X'''$ is an organic group with a molecular weight of not more than 456 having a main chain composed of 1 to 18 atoms.

2. The vinylidene fluoride copolymer according to claim 1, wherein the copolymer contains 0.01 to 10 mol % of structural units derived from the compound represented by Formula (3), relative to the total of structural units derived from vinylidene fluoride and structural units derived from the compound represented by Formula (3) taken as 100 mol %.

3. The vinylidene fluoride copolymer according to claim 1, which has an inherent viscosity of 0.5 to 5.0 dl/g.

4. The vinylidene fluoride copolymer according to claim 1, wherein the randomness of the structural units derived from the compound represented by Formula (3) is not less than 40%.

5. An electrode mixture for nonaqueous electrolyte secondary batteries comprising the vinylidene fluoride copolymer described in claim 1, an electrode active material and a nonaqueous solvent.

6. A positive electrode mixture for nonaqueous electrolyte secondary batteries comprising the vinylidene fluoride copolymer described in claim 1, a lithium-based positive electrode active material and a nonaqueous solvent.

7. An electrode for nonaqueous electrolyte secondary batteries obtained by applying the electrode mixture for nonaqueous electrolyte secondary batteries described in claim 5 to a collector, and drying the coating.

8. A positive electrode for nonaqueous electrolyte secondary batteries obtained by applying the positive electrode mixture for nonaqueous electrolyte secondary batteries described in claim 6 to a collector, and drying the coating.

9. A nonaqueous electrolyte secondary battery having the electrode for nonaqueous electrolyte secondary batteries described in claim 7.

10. A nonaqueous electrolyte secondary battery having the positive electrode for nonaqueous electrolyte secondary batteries described in claim 8.

\* \* \* \* \*